US012755457B2

(12) United States Patent
Chen et al.

(10) Patent No.: US 12,755,457 B2
(45) Date of Patent: Oct. 6, 2026

(54) DATA DISPLAY METHOD AND APPARATUS, ELECTRONIC DEVICE, AND STORAGE MEDIUM

(71) Applicant: Beijing Zitiao Network Technology Co., Ltd., Beijing (CN)

(72) Inventors: Haiyun Chen, Beijing (CN); Jiesheng Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 120 days.

(21) Appl. No.: 18/834,589

(22) PCT Filed: Jan. 18, 2023

(86) PCT No.: PCT/CN2023/072952

§ 371 (c)(1),
(2) Date: Jul. 30, 2024

(87) PCT Pub. No.: WO2023/143318

PCT Pub. Date: Aug. 3, 2023

(65) Prior Publication Data

US 2025/0124625 A1 Apr. 17, 2025

(30) Foreign Application Priority Data

Jan. 30, 2022 (CN) ......................... 202210113985.3

(51) Int. Cl.
*G06T 11/60* (2026.01)
*G06T 7/70* (2017.01)
(Continued)

(52) U.S. Cl.
CPC ................ *G06T 11/60* (2013.01); *G06T 7/73* (2017.01); *G06T 2200/24* (2013.01)

(58) Field of Classification Search
CPC ....... G06T 11/60; G06T 7/73; G06T 2200/24; G06T 3/18; G06T 3/0093; G06T 15/04;
(Continued)

(56) References Cited

U.S. PATENT DOCUMENTS

| | | | | |
|---|---|---|---|---|
| 11,663,820 B2 * | 5/2023 | Josephson | ............... | G06F 3/011 345/633 |
| 11,750,876 B2 * | 9/2023 | Lan | ........................ | G06V 20/48 725/32 |
| 2022/0276770 A1 * | 9/2022 | Davis | ................... | H04N 9/3147 |

FOREIGN PATENT DOCUMENTS

| | | |
|---|---|---|
| CN | 107360459 A | 11/2017 |
| CN | 110149530 A | 8/2019 |

(Continued)

OTHER PUBLICATIONS

International Search Report in PCT/CN2023/072952, mailed May 18, 2023, 5 pages.

*Primary Examiner* — Wesner Sajous
(74) *Attorney, Agent, or Firm* — Astute IP Law Group

(57) ABSTRACT

Embodiments of the disclosure disclose a data display method and apparatus, an electronic device, and a storage medium. The method includes: determining, in response to a display instruction for target display data, candidate positions in a display region according to a preset display mode, and determining reference positions in the display region according to the preset display mode and positions of current display data in the display region; determining priority values of the candidate positions based on distances between the candidate positions and the reference positions; and determining a target position from the candidate positions based on the priority values, and displaying the target display data according to the target position.

18 Claims, 4 Drawing Sheets

(51) Int. Cl.
*G06T 7/73* (2017.01)
*G06T 15/20* (2011.01)
*G06V 20/20* (2022.01)
*G09G 5/10* (2006.01)

(58) Field of Classification Search
CPC ............. G06T 7/70; G06T 2207/30201; G06T 2207/30204; G06F 3/0481–04847; G06F 3/0304; G06F 3/017; G06F 9/451; G06F 2203/012; G06F 2203/04806; G06V 20/20; G06V 40/28; G06V 40/40; G06V 40/117; G06V 40/67; G06V 10/464; G06V 10/75; G06Q 20/40145; G09G 5/10; G09G 5/30
See application file for complete search history.

(56) References Cited

FOREIGN PATENT DOCUMENTS

| | | | | | |
|---|---|---|---|---|---|
| CN | 110415005 | A | | 11/2019 | |
| CN | 113596354 | A | * | 11/2021 | ......... G06F 18/2321 |

* cited by examiner

DATA DISPLAY METHOD AND APPARATUS, ELECTRONIC DEVICE, AND STORAGE MEDIUM

CROSS-REFERENCE TO RELATED APPLICATION(S)

This application is a U.S. National Stage Application of PCT Application Serial No. PCT/CN2023/072952, filed on Jan. 18, 2023, which claims priority to Chinese Patent Application No. 202210113985.3, filed with China National Intellectual Property Administration on Jan. 30, 2022, which are incorporated herein by reference in their entireties.

FIELD

Embodiments of the disclosure relate to the field of computer technology, and for example, relate to a data display method and apparatus, an electronic device, and a storage medium.

BACKGROUND

In the related art, some applications (Apps) can display interaction data in an interface so as to improve an interactive atmosphere. The interaction data in the related art is typically displayed in the form of scrolling barrage, and the display method is monotonous and cannot satisfy diversified display requirements of users.

SUMMARY

Embodiments of the disclosure provide a data display method and apparatus, an electronic device, and a storage medium, which can enrich display methods and satisfy diversified display requirements of users.

In a first aspect, an embodiment of the disclosure provides a data display method, including: determining, in response to a display instruction for target display data, candidate positions in a display region according to a preset display mode, and determining a reference position in the display region according to the preset display mode and positions of current display data in the display region; determining priority values of the candidate positions based on distances between the candidate positions and the reference position; and determining a target position from the candidate positions based on the priority values, and displaying the target display data according to the target position.

In a second aspect, an embodiment of the disclosure further provides a data display apparatus, including: a position determination module, configured to determine, in response to a display instruction for target display data, candidate positions in a display region according to a preset display mode, and determine a reference position in the display region according to the preset display mode and positions of current display data in the display region; a priority value determination module, configured to determine priority values of the candidate positions based on distances between the candidate positions and the reference position; and a display module, configured to determine a target position from the candidate positions based on the priority values, and display the target display data according to the target position.

In a third aspect, an embodiment of the disclosure further provides an electronic device. The electronic device includes: one or more processors; and a storage means, configured to store one or more programs, When the one or more programs are executed by the one or more processors, the one or more processors implement the data display method according to any one of the embodiments of the disclosure.

In a fourth aspect, an embodiment of the disclosure further provides a storage medium including computer executable instructions. The computer executable instructions, when executed by a computer processor, are configured to execute the data display method according to any one of the embodiments of the disclosure.

BRIEF DESCRIPTION OF THE DRAWINGS

In the accompanying drawings, same or similar reference numerals denote same or similar elements. It should be understood that the accompanying drawings are illustrative, and components and elements may not necessarily be drawn to scale.

DETAILED DESCRIPTION OF EMBODIMENTS

It should be understood that the steps recorded in the method implementations in the disclosure may be performed in different orders and/or in parallel. In addition, the method implementations may include additional steps and/or omit the execution of the shown steps. The scope of the disclosure is not limited in this aspect.

The term "including" and variations thereof used in this specification are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". The related definitions of other terms will be provided in the subsequent description.

It should be noted that "first," "second," and other concepts mentioned in the disclosure are only for distinguishing different apparatuses, modules, or units, and are not intended to limit the order or relation of interdependence of functions performed by these apparatuses, modules, or units.

It should be noted that modifications such as "a" and "a plurality of" mentioned in the disclosure are indicative rather than limiting, and those skilled in the art should understand that unless otherwise explicitly specified in the context, it should be interpreted as "one or more".

Figure 1:
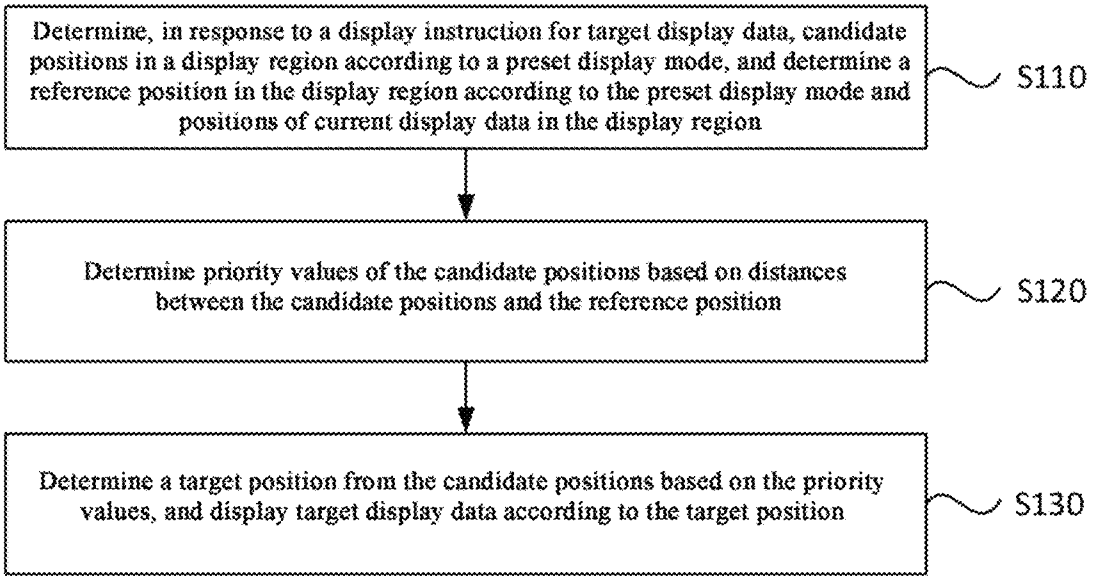
FIG. 1 is a schematic flowchart of a data display method according to an embodiment of the disclosure.

FIG. 1 is a schematic flowchart of a data display method according to an embodiment of the disclosure. This embodiment of the disclosure is applicable to a case of data display in an interface, such as a case of displaying interaction data in a client interface. The method may be executed by a data display apparatus. The apparatus may be implemented in the form of software and/or hardware. The data display apparatus may be integrated in a client and installed in an electronic device together with the client, such as a mobile phone, a computer, or other electronic devices.

As shown in FIG. 1, the data display method provided by this embodiment may include the following:

S110: in response to a display instruction for target display data, candidate positions in a display region are determined according to a preset display mode, and a reference position in the display region is determined according to the preset display mode and positions of current display data in the display region.

This embodiment of the disclosure may involve the following interactive scenario with a plurality of clients.

At least two clients establishing a communication connection may form a communication range. Any client in the communication range may send a request for acquiring data-to-be-played (e.g., audio and video data) to a backend server. The server may send, in response to the request, the data-to-be-played to the plurality of clients within the communication range. The plurality of clients may synchronously play the data-to-be-played, so as to satisfy the requirements of multiple persons for watching audio and videos online.

In the synchronous play process, any client within the communication range may also send the interaction data (e.g., data including texts, pictures, emojis, etc.) to a server side so as to interact with the play content and/or other clients, such as sending a barrage in the process of watching the video. The server may send the received interaction data to the plurality of clients within the communication range. The plurality of clients may display the interaction data received from the server in the synchronous play process, thereby creating a lively and interesting interactive atmosphere and enhancing the synchronous viewing experience.

The client within the communication range may be a client integrated with the data display apparatus provided by this embodiment of the disclosure. The target display data may be interaction data in the interactive scenario. The client may generate the display instruction for displaying the interaction data when sending or receiving the interaction data, that is, the display instruction may be generated based on sending or receiving the target display data. The target display data currently displayed in the display region may be referred to as current display data.

The client may predefine a setting interface with a display mode so as to receive a setting instruction inputted by a user, thereby presetting the display mode to obtain the preset display mode. The preset display mode may include at least one attribute field, and the attribute field may include but not limited to fields related to display such as distribution and effects. The display region may be considered as a valid region available for displaying the target display data. The candidate position may be considered as candidate pixel point coordinates used for displaying the target display data in the display region; the positions of the current display data may include pixel point coordinates occupied by the currently displayed data in the display region; and the reference position may be considered as pixel point coordinates used for evaluating the quality of the candidate position in the display region.

Due to differences in interface size, user interface (UI) element size settings, etc. among the plurality of clients, there may be variations in the display regions of the plurality of clients. As clients may prefer different display modes, the correspondingly selected candidate positions and reference positions may also vary accordingly. After the display instruction is generated, the client may respond to the display instruction, determining the corresponding candidate position from the display region at the client according to the preset display mode at the client, and determining the corresponding reference position according to the preset display mode at the client and the positions of the current display data.

Typically, the more candidate positions that are determined, the better the display effect of the evaluated target position, but the lower the efficiency of determining the target position. To balance the display effect and the efficiency of determining the target position. the optimal number of candidate positions may be determined through preliminary experiments. For example, an experimental model K+n*k1 may be constructed; K and k1 may be set according to experience; in each round of experiments, the value of n may be adjusted, and a balance degree is recorded; and finally, after a preset number of experimental rounds, the value of n with the best balance degree may be used as the determined number of candidate positions in the data display method.

S120: priority values of the candidate positions are determined based on distances between the candidate positions and the reference position.

Because the candidate positions and the reference position may be pixel point coordinates, the distance between the candidate positions and the reference position may be determined by calculating the distance between the pixel point coordinates (e.g., Euclidean distance or Manhattan distance). For example, the following may be included: each candidate position is traversed, and the distance between the current candidate position and the plurality of reference positions may be calculated; the final distance between the current candidate position and the reference positions is determined based on the plurality of distances, and the final distance is taken as the distance between the current candidate position and the reference position; and until the traversing is completed, the distance between each candidate position and the reference position may be obtained.

Before executing the data display method, a corresponding relationship between the distance and the priority value may be preset. For example, a corresponding relationship table between a distance range and priority values may be preset, for example, a mathematical formula representing the corresponding relationship between the distances and the priority values may be pre-constructed, and for another example, a machine learning model that can predicate the corresponding relationship between the distances and the priority values may be pre-trained, which are not exhaustive herein.

When the priority value of the candidate position is determined, the priority value of the candidate position may be determined according to the preset corresponding relationship between the distances and the priority values at every time when the distance between each candidate position and the reference positions is determined; or, after the distance between the candidate position and the reference positions is determined, the priority value of the candidate position is uniformly determined according to the preset corresponding relationship between the distances and the priority values.

S130: a target position is determined from the candidate positions based on the priority values, and target display data is displayed according to the target position.

After the priority values of the candidate positions are determined, the candidate position with the highest priority value may be taken as the target position. In addition, rendering parameters of the target display data may be set according to the target position, such that the target display data may be rendered and displayed according to the rendering parameters.

For example, there is a case that the client continuously receives display instructions for a plurality of target display data. In this case, the client may determine, according to the time sequence of the display instructions, the target position of the corresponding target display data for display. In addition, when the display duration of the target display data reaches a preset duration, the display may be canceled to avoid excessive target display data obscuring the play back of the data-to-be-played, thereby improving viewing experience.

In this embodiment, the plurality of clients determine, according to the respective preset display modes, the corresponding candidate positions and reference positions in the respective display regions, determine the priority values of the candidate positions based on the distances from the reference positions, and determine, according to the priority values, the target position with a better display effect in the preset display mode, thereby enriching the display mode, and satisfying diversified display requirements of users. In addition, candidate position determination and priority value calculation may be performed every time when the target display data needs to be displayed, thereby determining the target position in a lazy loading manner, and reducing resource consumption.

For example, the display interface with the display region may further include a deployment region of preset interface elements; and the display region is determined based on the deployment region, and the deployment region is determined by attributes of the preset interface elements.

For example, the interface elements may be considered as the above UI elements. To avoid the display region obstructing the triggering of functional controls and the display of communication screens, the client may determine the deployment region of the UI elements based on the attributes (including but not limited to element size, region, shape and/or effects, etc.) of the existing UI elements on the interface. In addition, an effective area for displaying the target display data may be dynamically adjusted according to the deployment region of the UI elements, that is, the display region is dynamically determined. For example, the client may take the remaining region after removing the interface element deployment region from the interface region as the display region.

Figure 2:
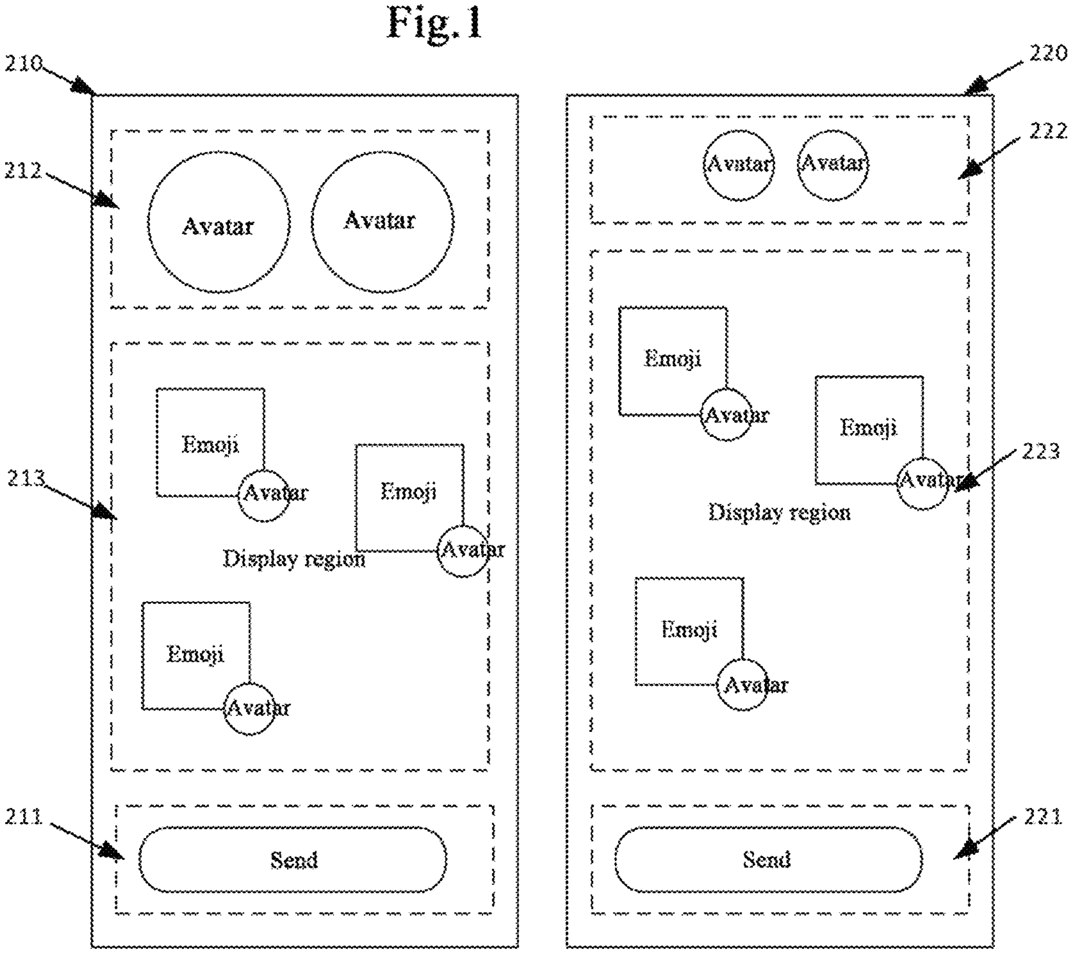
FIG. 2 is a schematic diagram of an interface in a data display method according to an embodiment of the disclosure.

Exemplarily, FIG. 2 is a schematic diagram of an interface in a data display method according to Embodiment 1 of the disclosure.

An interface 210 and an interface 220 in FIG. 2 may be both interfaces for synchronously playing data-to-be-played, and the two interface regions may be the same in size. Both the interfaces may be deployed with the interface elements, such as a send control for sending the interaction data and an avatar control for displaying a client avatar or a communication screen. The deployment region 211 of the send control in the interface 210 and the deployment region 221 of the send control in the interface 220 may be the same in size. The size of the deployment region 212 of the avatar control in the interface 210 may be larger than the deployment region 222 of the avatar control in the interface 220.

The display region 213 in the interface 210 may be the interface region without the deployment region 211 of the send control and the deployment region 212 of the avatar control; and the display region 223 in the interface 220 may be the interface region without the deployment region 221 of the send control and the deployment region 222 of the avatar control. That is, the display region 213 in the interface 210 is smaller than the display region 223 in the interface 220.

For example, the target display data includes interactive emojis; and the step of displaying target display data according to the target position includes: the target position is set as a position parameter for a preset feature point of the interactive emoji, and the interactive emoji is rendered based on the position parameter.

The interactive emoji may be a dynamic emoji or a static emoji. In addition, the interactive emoji, when displayed in the display region, may be associated with a user avatar or user nickname, etc. for display, thereby achieving the effect of indicating a source client of the interactive emoji. For example, referring to FIG. 2 again, the lower right portion of the interactive emoji in the display region in FIG. 2 may be associated with the user avatar for display.

The client may generate the display instruction in response to a trigger event of the send control in the interface at the client, or may generate a display instruction in response to a trigger event of send controls of other clients sent by the server side. The client may determine, in response to the display instruction, the candidate positions in the display region according to the preset display mode, and determine the reference positions in the display region according to the preset display mode and the positions of the current display data in the display region; according to the distances between the candidate positions and the reference positions, the priority values of the candidate positions are determined; and the target position is determined from the candidate positions according to the priority values, and the interactive emoji is displayed according to the target position. Therefore, the interactive emoji can be sent or received.

Preset feature points of the interactive emoji may include, for example, a center point, an upper vertex, a lower vertex, a left vertex, a top vertex, etc. For example, it may be the center point, which is beneficial to determining the accurate priority value according to the distance. The target position is set as the position parameter for the preset feature point of the interactive emoji, which may be considered as setting the rendering parameters for the target display data. The interactive emoji is rendered based on the position parameter, which may optimize a display effect of the interactive emoji, and may also make the interaction more vivid, interesting, and atmospheric.

According to the technical solution of this embodiment of the disclosure, in response to the display instruction for the target display data, the candidate positions in the display region are determined according to the preset display mode, and the reference positions in the display region are determined according to the preset display mode and the positions of the current display data in the display region; according to the distances between the candidate positions and the reference positions, the priority values of the candidate positions are determined; and the target position is determined from the candidate positions according to the priority values, and the target display data is displayed according to the target position.

According to the different preset display modes, the corresponding candidate positions and reference positions are determined in the display region, the priority values of the candidate positions are determined based on the distances from the reference positions, and according to the priority values, the target position with a better display effect in the preset display mode is determined, thereby enriching the display mode, and satisfying diversified display requirements of users. In addition, by determining the priority values of the candidate positions when the target display data needs to be displayed, the target position may be determined in the lazy loading manner, and resource consumption is reduced.

This embodiment of the disclosure may be combined with a plurality of exemplary solutions in the data display method provided in the above embodiment. The data display method provided by this embodiment provides a detailed description of determination of the candidate positions and the reference positions.

For example, the preset display mode includes a data distribution method, a data distribution position, and a data overlap degree. The candidate positions and the reference positions are determined based on the following steps: the candidate positions in the display region are determined according to the data distribution method; and the reference positions in the display region are determined according to the data distribution position, the data overlap degree, and the positions of the current display data in the display region.

The data distribution method may include, for example, random distribution, distribution according to rules, etc. The distribution according to rules may be, for example, distribution according to preset shapes, such as heart shapes, spiral shapes, firework shapes, and other shape distributions. By distributing the data according to a preset shape, the preset image may be presented when there are a certain quantity of interaction data, bringing a sense of surprise to the users and enhancing the user experience to some extent.

The data distribution position may represent a position that the user prefers when expecting data display, which may include, for example, a center position, an edge position, etc. Exemplarily, when the data distribution position is the center position, it may represent that the user prefers the data to be displayed towards the center.

The data overlap degree may represent the degree of overlap when the user allows the data display, which may include, for example, no overlap, low overlap, and high overlap from low to high. Exemplarily, when the data overlap degree is no overlap, it may represent that the user expects a certain distance between the target display data without overlap.

The step of determining the candidate positions in the display region according to the data distribution method may include at least one of the following: when the data distribution method is random distribution, the candidate positions in the display region may be randomly determined; and when the data distribution method is distribution according to rules, the candidate positions may be determined according to the distribution rules and the position of the target display data being displayed.

The step of determining the reference positions in the display region according to the data distribution position, the data overlap degree, and the positions of the current display data in the display region may include at least one of the following: if the data overlap degree is high overlap, it may be considered that the user has a high tolerance for the overlap of target display data, and in this case, the data distribution positions and positions of a small quantity of current display data may be taken as the reference positions. If the data overlap degree is low overlap or no overlap, it may be considered that the user expects a certain distance between the target display data. In this case, the data distribution positions may be taken as the reference positions, and the positions of a large quantity of or all of the current display data may also be taken as the reference positions.

For example, the candidate positions are determined according to the data distribution method in the preset display mode, such that the target display data may be displayed according to different distribution methods (e.g., random distribution and distribution according to rules), thereby achieving the diversified display effects. By determining the reference positions according to the data distribution position and the data overlap degree in the preset display mode, the reference positions may be selected according to the distribution position preferred by the user (e.g., a center position and an edge position) and the overlap degree allowed by the user (e.g., no overlap, low overlap, and high overlap), thereby determining the target position satisfying user requirements based on the reference positions, and improving user experience.

For example, determining the reference positions in the display region according to the data distribution position and the data overlap degree may include: the reference positions in the display region are determined according to the data distribution position, the data overlap degree, and the positions of the current display data in the display region, which specifically includes: at least one first reference position in the display region is determined according to the data distribution position; at least one second reference position is determined from the positions of the current display data according to the data overlap degree; and the data overlap degree is in inverse correlation with the number of the second reference positions.

Determining the first reference position according to the data distribution position may be implemented by using the data distribution position as the first reference positions. Determining the second reference position according to the data overlap degree may include: if the data overlap degree is no overlap, the positions of all current display data may be taken as the second reference positions; if the data overlap degree is low overlap, the positions of a first preset proportion of the current display data may be taken as the second reference positions; and if the data overlap degree is high overlap, the positions of a second preset proportion of the current display data may be taken as the second reference positions, where the first preset proportion is greater than the second preset proportion. Therefore, inverse correlation between the data overlap degree and the number of the second reference positions may be achieved.

Determining priority values of the candidate positions based on distances between the candidate positions and the reference positions includes the following: the priority values of the candidate positions are determined based on a relationship between the candidate positions and the first reference position as well as the second reference position. For example, because the reference position is determined based on the data distribution position, the closer the candidate position is to the reference position, the higher the priority value; and for the reference position determined based on the data overlap degree, the farther the candidate position is from the reference position, the higher the priority value. The reference positions may be divided into the first reference position and the second reference position according to the corresponding relationship between the distance from the reference position and the priority value. Then, the priority values of the candidate positions may be determined according to the distances between the candidate positions and the first reference position as well as between the candidate positions and the second reference position, and the above relationship.

For example, determining priority values of the candidate positions may include the following: the plurality of candidate positions are traversed, and a first priority value of the traversed current candidate position is determined according to the sum of first distances between the traversed current candidate positions and at least one first reference position; the sum of the first distances is in inverse correlation with the first priority value; a second priority value of the traversed current candidate position is determined according to the sum of second distances between the traversed current candidate positions and at least one second reference position; the sum of the second distances is in positive correlation with the second priority value; and the priority value of the traversed current candidate position is determined according to the first priority value and the second priority value until traversing is completed, and the priority values of the plurality of candidate positions are obtained.

For example, in the process of determining the priority values of the candidate positions, the plurality of candidate positions may be traversed to respectively determine the priority values of the plurality of candidate positions. The first distance between each candidate position and the at least one first reference position may be determined, the at least one first distance is summed to obtain a first distance sum, and the first priority value is determined according to the inverse correlation relationship between the first distance sum and the first priority value; the second distance between each candidate position and the at least one second reference position may also be determined, the at least one second distance is summed to obtain a second distance sum, and the second priority value is determined according to the positive correlation relationship between the second distance sum and the second priority value; and finally, the priority value of each candidate position may be determined according to the first priority value and the second priority value.

Because the display regions corresponding to the plurality of clients may have differences in size, if the first priority value and the second priority value are respectively determined according to the first distance sum and the second distance sum, determination of the first priority value and the second priority value may lack a unified standard. Therefore, in some implementations, the first priority value of the traversed current candidate position may be determined by the normalized sum of the first distances; and the second priority value of the traversed current candidate position may be determined by the normalized sum of the second distances. Therefore, the universality of determining the priority values may be improved.

The normalization of the first distance sum and/or the second distance sum may be considered as mapping the first distance sum and/or the second distance sum into a preset range, such as (0), N). N may be determined through a preliminary experiment. For example, an experimental model A*k2 may be first constructed; then, k2 may be set according to experience; and then in each round of experiments, the value of A may be adjusted, and an evaluation effect of the candidate position is recorded; and finally, after a preset number of experimental rounds, the value of A*k2 with the best evaluation effect may be used as the maximum value N within the preset range for normalization.

Figure 3:
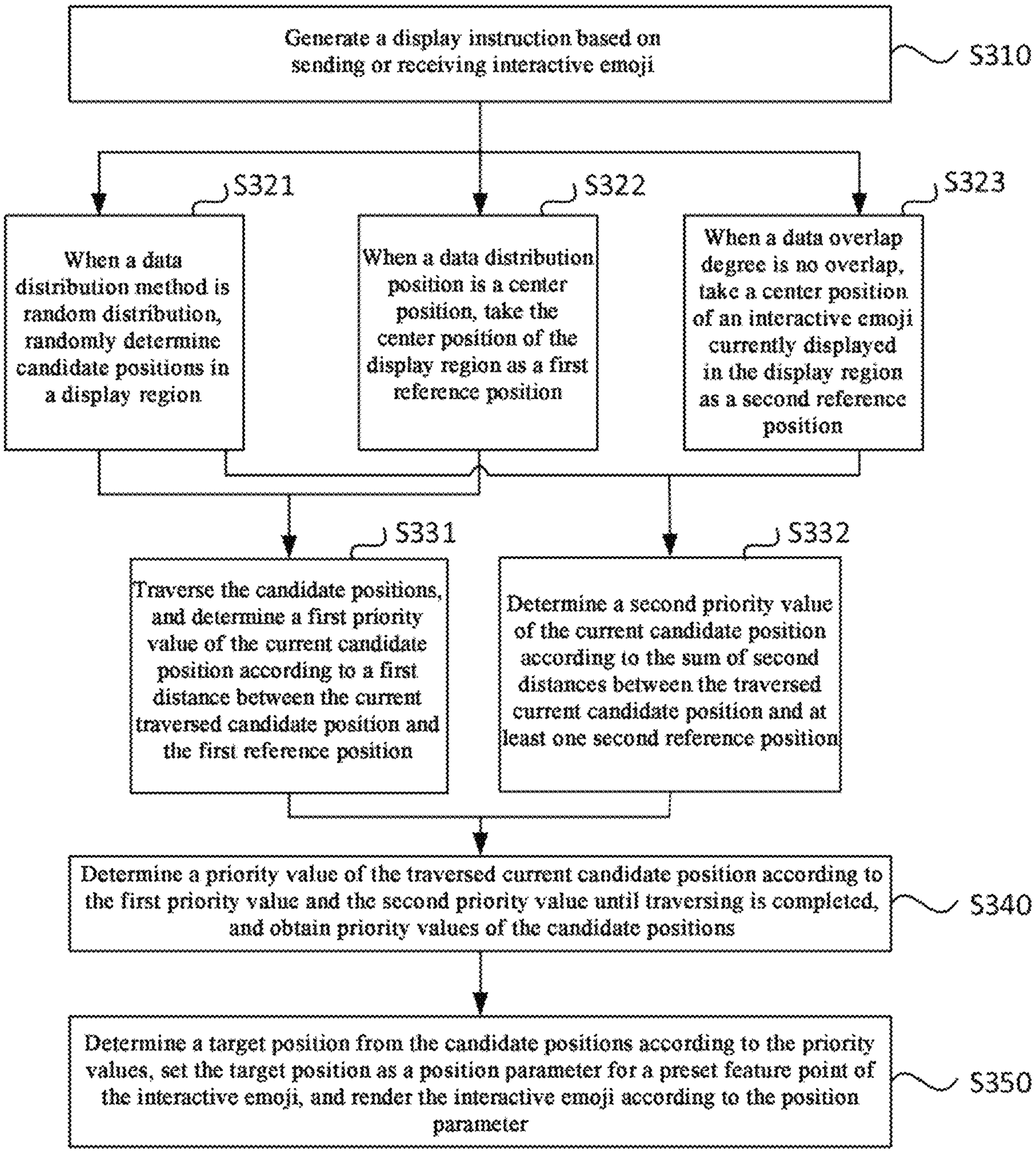
FIG. 3 is a schematic flowchart of a data display method according to another embodiment of the disclosure.

Determining the priority value of the traversed current candidate position according to the first priority value and the second priority value may include the following: the sum of the first priority value and the second priority value may be taken as the priority value of the traversed current candidate position. Alternatively, the average value of the first priority value and the second priority value may be taken as the priority value of the traversed current candidate position. In addition, other calculation methods that may achieve positive correlation between the priority value and the first priority value as well as the second priority value may also be applied here, which are not enumerated exhaustively. Exemplarily, FIG. 3 is a schematic flowchart of a data display method according to another embodiment of the disclosure. In this example, the target display data may be interactive emojis; and the data distribution method in the preset display mode may be random distribution, the data distribution position may be the center position, and the data overlap degree may be no overlap, thereby aiming to achieve a display effect of a random display of interactive emojis with some spacing maintained therebetween and a bias towards the center. Referring to FIG. 3, the data display method provided in this example may include the following:

S310: a display instruction is generated based on sending or receiving interactive emojis; and in response to the display instruction, steps S321-S323 are performed.

S321: when a data distribution method is random distribution, candidate positions in a display region are randomly determined.

S322: when a data distribution position is a center position, the center position of the display region is taken as a first reference position.

S323: when a data overlap degree is no overlap, a center position of an interactive emoji currently displayed in the display region is taken as a second reference position.

S331: the candidate positions are traversed, and a first priority value of the current candidate position is determined according to a first distance between the current traversed candidate position and the first reference position.

The first distance is inversely correlated with the first priority value. For example, if the first distance is d1, the first priority value may be d1*(−a), where a is a positive number.

S332: a second priority value of the current candidate position is determined according to the sum of second distances between the traversed current candidate position and at least one second reference position.

The sum of the second distances is positively correlated with the second priority value. For example, if the sum of the second distances is d2, the second priority value may be d2*b, where b is a positive number.

S340: a priority value of the traversed current candidate position is determined according to the first priority value and the second priority value until traversing is completed, and priority values of the candidate positions are obtained.

The sum of the first priority value and the second priority value may be taken as the priority value of the current candidate position. Referring to the above example given for the first priority value and the second priority value, the final priority value may be, for example, res=d2*b−d1*a.

S350: a target position is determined from the candidate positions according to the priority values, the target position is set as a position parameter for a preset feature point of the interactive emoji, and the interactive emoji is rendered according to the position parameter.

The technical solution of this embodiment of the disclosure provides a detailed description of determination of the candidate positions and the reference positions. The candidate positions are determined according to the data distribution method in the preset display mode, such that the target display data can be displayed based on different distribution methods (e.g., random distribution and distribution according to rules), thereby achieving the diversified display effects. By determining the reference positions according to the data distribution position and the data overlap degree in the preset display mode, the reference positions can be selected according to the distribution position preferred by the user (e.g., a center position and an edge position) and the overlap degree allowed by the user (e.g., no overlap, low overlap, and high overlap), thereby determining the target position satisfying user requirements based on the reference positions, and improving user experience. Because the reference position is determined based on the data distribution position, the closer the candidate position is to the reference position, the higher the priority value; and for the reference position determined based on the data overlap degree, the farther the candidate position is from the reference position, the higher the priority value. The reference positions can be divided into the first reference position and the second reference position according to the corresponding relationship between the distance from the reference position and the priority value, and the first priority value and the second priority value can be respectively determined to obtain the priority values of the candidate positions.

In addition, the data display method provided by this embodiment of the disclosure and the data display method provided by the foregoing embodiment belong to the same disclosure concept, and for technical details not described in detail in this embodiment, reference may be made to the foregoing embodiment. The same technical features have the same beneficial effects in this embodiment and the foregoing embodiment.

This embodiment of the disclosure may be combined with a plurality of exemplary solutions in the data display method provided in the above embodiment. The data display method provided by this embodiment provides a detailed description of the two-dimensional array corresponding to the display region. By maintaining the two-dimensional array corresponding to the current display data, the positions of the current display data can be recorded, which is beneficial to determining the candidate positions and the reference positions. In addition, after the priority values of the candidate positions are calculated, the priority values may be recorded in array elements corresponding to the candidate positions, which is beneficial to determining the target position.

For example, after the target display data is displayed according to the target position, the data display method may further include the following:

The current display data is updated according to the target display data, and array elements in the two-dimensional array are maintained according to the updated current display data; and the array elements correspond to pixel points in the display region, and when the array elements are preset values, it represents that the corresponding pixel points belong to the current display data.

The array elements corresponding to pixel points in the display region may be understood as pixel points corresponding to pixel coordinates in the display region corresponding to array elements at corresponding row and column positions of the two-dimensional array. For example, a pixel point located at the $M^{th}$ row and $N^{th}$ column in the display region corresponds to the array element at the $M^{th}$ row and $N^{th}$ column of the two-dimensional array. After determining the display region, the client may generate a two-dimensional array corresponding to the display region.

Updating the current display data according to the target display data may include taking the target display data being displayed as the current display data, and may also include removing the target display data that disappears after the display from the current display data. Maintaining array elements in the two-dimensional array according to the updated current display data may include the following: when the target display data is taken as the current display data, data elements corresponding to pixel points occupied by the target display data may be set to preset values; and when the target display data is removed from the current display data, the corresponding data elements set to the preset values may be emptied. Therefore, the effect of utilizing the two-dimensional array for recording the positions of the current display data can be achieved.

The preset value may be a value outside the range of the priority values. For example, when the range of the priority values is (0,1), the preset value may be 0. Therefore, after determining the priority values of the candidate positions, the priority values may be temporarily stored in the corresponding array elements to be distinguished from the preset values. In addition, the stored priority values may be emptied after the target position is determined, such that the two-dimensional array may have the function of recording the priority values of the candidate positions in the process of determining the display position of the target display data every time.

By maintaining the data elements in the two-dimensional array according to the updated current display data, in response to a display instruction for new target display data, the positions of the current display data in the display region may be determined according to the two-dimensional array. For example, the positions of pixel points corresponding to the array elements equal to the preset values in the two-dimensional array may be taken as the positions of the current display data in the display region. Then, when the reference positions are determined, the reference positions in the display region may be determined according to the data distribution position and the data overlap degree in the preset display mode, as well as the positions of the current display data in the display region.

In addition, the two-dimensional array may also label the reference positions and the candidate positions, so as to calculate the distances between the candidate positions and the reference positions. Exemplarily, FIG. 4 is a schematic diagram of a two-dimensional array of a data display method according to an embodiment of the disclosure.

Figure 4:
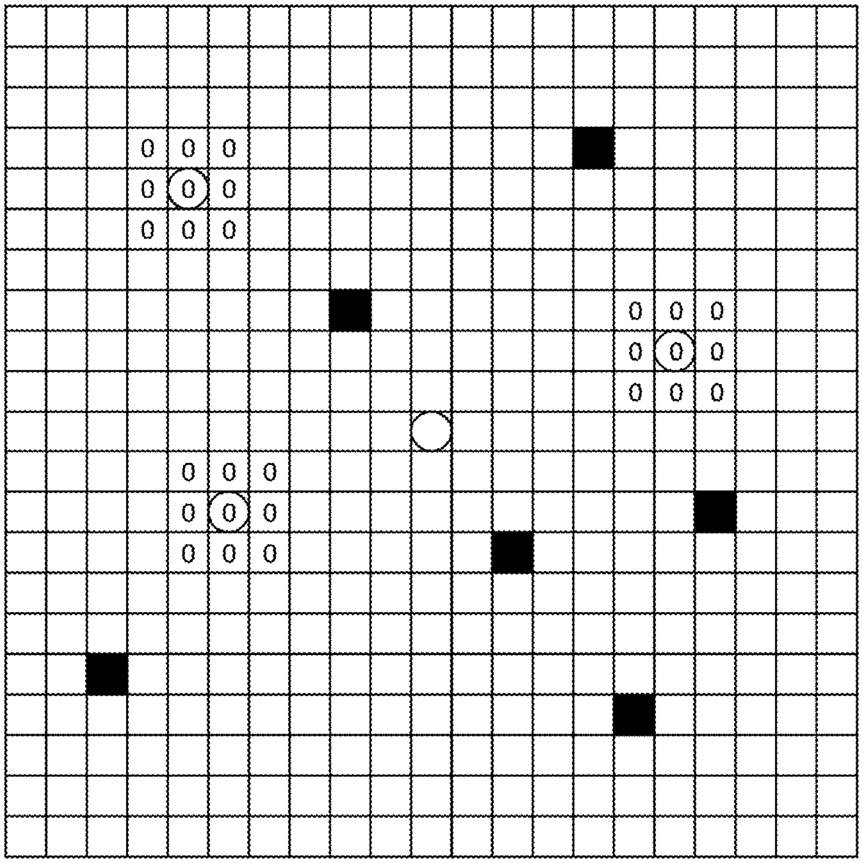
FIG. 4 is a schematic diagram of a two-dimensional array of a data display method according to an embodiment of the disclosure.

Referring to FIG. 4, boxes in the figure may represent array elements in the two-dimensional array, and the array elements are in one-to-one correspondence with pixel points in a display region. The array elements set to 0 in FIG. 4 may represent that the corresponding pixel points belong to displaying target display data. When new target display data is added, a plurality of candidate positions (represented by black boxes in the figure) and reference positions (represented by circles embedded in boxes in the figure) may be determined. The candidate positions in the two-dimensional array may be traversed, the distances between the traversed current candidate position and the reference positions are calculated, and priority values of the plurality of candidate positions are determined. The corresponding array elements may be set according to the priority values of the plurality of candidate positions so as to record the priority values of the plurality of candidate positions. Therefore, the positions of the displaying target display data and the priority values of the candidate positions can be recorded based on the two-dimensional array.

The technical solution of this embodiment of the disclosure provides a detailed description of maintaining the two-dimensional array corresponding to the display region. By maintaining the two-dimensional array corresponding to the displaying target display data, the positions of the displaying target display data may be recorded, which is beneficial to determining the candidate positions and the reference positions. In addition, after the priority values of the plurality of candidate positions are calculated, the priority values may also be recorded in the array elements corresponding to the plurality of candidate positions, which is beneficial to determining the target position.

The data display method provided by this embodiment of the disclosure and the data display method provided by the foregoing embodiment belong to the same disclosure concept, and for technical details not described in detail in this embodiment, reference may be made to the foregoing embodiment. The same technical features have the same beneficial effects in this embodiment and the foregoing embodiment.

Figure 5:
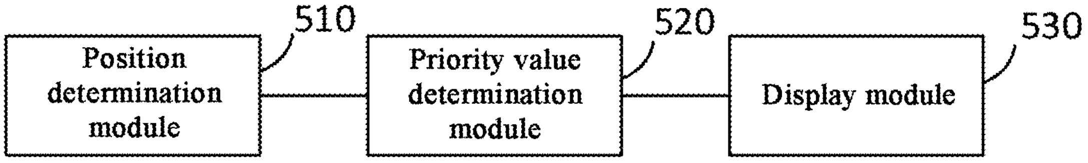
FIG. 5 is a structural schematic diagram of a data display apparatus according to an embodiment of the disclosure.

FIG. 5 is a structural schematic diagram of a data display apparatus according to an embodiment of the disclosure. The data display apparatus provided by this embodiment is applicable to a case of data display in an interface, such as a case of displaying interaction data in a client interface.

As shown in FIG. 5, the data display apparatus provided by this embodiment may include: a position determination module 510, configured to determine, in response to a display instruction for target display data, candidate positions in a display region according to a preset display mode, and determine a reference position in the display region according to the preset display mode and positions of current display data in the display region; a priority value determination module 520, configured to determine priority values of the candidate positions based on distances between the candidate positions and the reference position; and a display module 530, configured to determine a target position from the candidate positions based on the priority values, and display the target display data according to the target position.

For example, the preset display mode includes a data distribution method, a data distribution position, and a data overlap degree.

The position determination module may determine the candidate positions and the reference position based on the following steps.

The candidate positions in the display region are determined according to the data distribution method.

The reference position in the display region are determined according to the data distribution position, the data overlap degree, and the positions of the current display data in the display region.

For example, the position determination module may be configured to: determine at least one first reference position in the display region according to the data distribution position; and determine at least one second reference position from the positions of the current display data according to the data overlap degree, the data overlap degree being in inverse correlation with the number of the second reference positions.

The priority value determination module may determine the priority values of the candidate positions based on a relationship between the candidate positions and the first reference positions as well as between the candidate positions and the second reference positions.

For example, the priority value determination module may be configured to: traverse the candidate positions, and determine a first priority value of the traversed current candidate position according to the sum of first distances between the traversed current candidate positions and at least one first reference position, the sum of the first distances being in inverse correlation with the first priority value; determine a second priority value of the traversed current candidate position according to the sum of second distances between the traversed current candidate positions and at least one second reference position, the sum of the second distances being in positive correlation with the second priority value; determine a priority value of the traversed current candidate position according to the first priority value and the second priority value until traversing is completed, and obtain priority values of the candidate positions.

For example, the priority value determination module may be configured to use the sum of the first priority value and the second priority value as the priority value of the traversed current candidate position.

For example, the first priority value of the traversed current candidate position is determined based on the normalized sum of the first distances; and the second priority value of the traversed current candidate position is determined based on the normalized sum of the second distances.

For example, the data display apparatus may further include: an array maintenance module, configured to update, after displaying target display data according to a target position, current display data according to the target display data, and maintain array elements in a two-dimensional array according to the updated current display data, the array elements corresponding to pixel points in the display region, and when the array elements are preset values, it representing that the corresponding pixel points belong to the current display data.

The position determination module may be configured to: determine, in response to a display instruction for new target display data, the positions of the current display data in the display region according to the two-dimensional array.

For example, the display instruction is generated by sending or receiving the target display data.

For example, the display interface to which the display region belongs further includes a deployment region for preset interface elements; and the display region is determined based on the deployment region, and the deployment region is determined by attributes of the preset interface elements.

For example, the target display data includes interactive emojis. The display module may be configured to: set a target position as a position parameter for a preset feature point of the interactive emoji, and render the interactive emoji according to the position parameter.

The data display apparatus provided by this embodiment of the disclosure may execute the data display method provided by any embodiment of the disclosure, and has the corresponding functional modules and beneficial effects for executing the method.

It should be noted that the plurality of units and modules included in the apparatus are only divided according to functional logics, but are not limited to the above division, as long as the corresponding functions may be achieved; and in addition, the specific names of the plurality of functional units are only for the convenience of distinguishing each other, and are not intended to limit the scope of protection of the embodiments of the disclosure.

Figure 6:
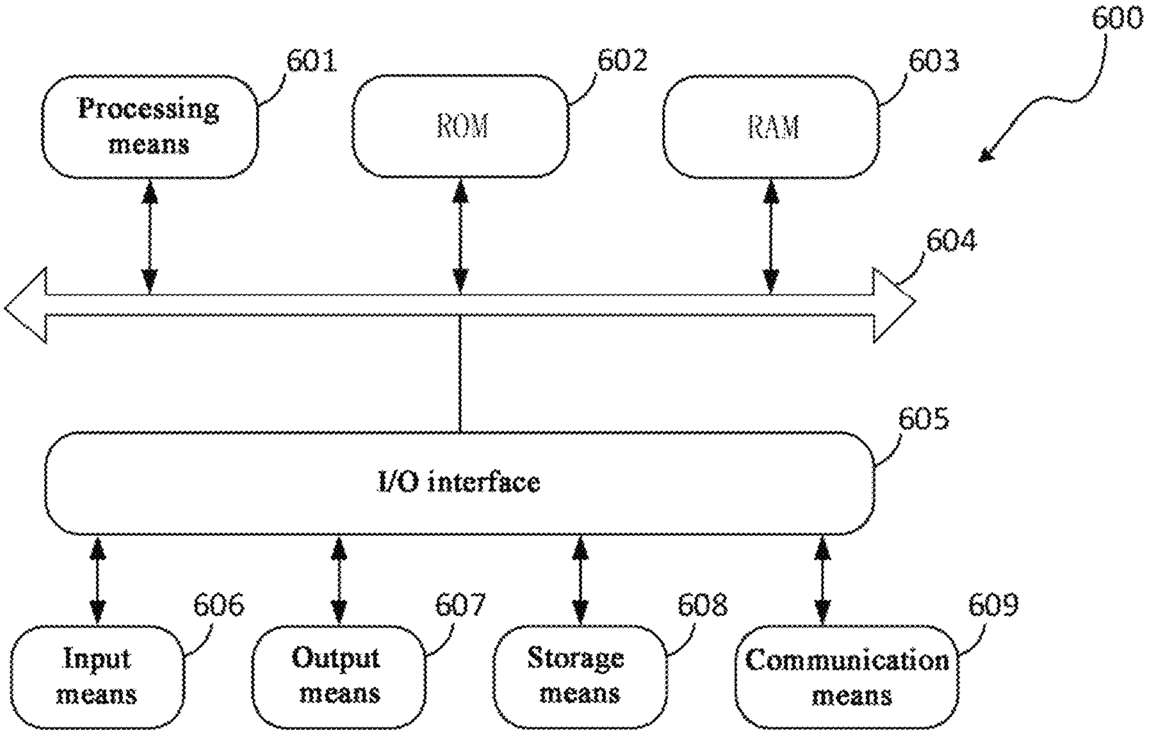
FIG. 6 is a structural schematic diagram of an electronic device according to an embodiment of the disclosure.

Referring to FIG. 6 as below; FIG. 6 illustrates a structural schematic diagram of an electronic device (e.g., a terminal device or a server in FIG. 6) 600 applicable to implementing embodiments of the disclosure. The terminal device in this embodiment of the disclosure may include but not limited to mobile terminals such as a mobile phone, a notebook computer, a digital radio receiver, a personal digital assistant (PDA), a portable Android device (PAD), a portable media player (PMP), a vehicle-mounted terminal (e.g., a vehicle-mounted navigation terminal), and fixed terminals such as a digital TV and a desk computer. The electronic device shown in FIG. 6 is merely an example, which should not impose any limitations on functions and application ranges of this embodiment of the disclosure.

As shown in FIG. 6, the electronic device 600 may include a processing means (e.g., a central processing unit and a graphics processing unit) 601, which may perform various appropriate actions and processing according to programs stored on a read-only memory (ROM) 602 or loaded from a storage means 608 into a random access memory (RAM) 603. The RAM 603 further stores various programs and data required for the operation of the electronic device 600. The processing means 601, the ROM 602, and the RAM 603 are connected to one another through a bus 604. An input/output (I/O) interface 605 is also connected to the bus 604.

Typically; the following means may be connected to the I/O interface 605; an input means 606, including, for example, a touchscreen, a touchpad, a keyboard, a mouse, a camera, a microphone, an accelerometer, and a gyroscope; an output means 607, including, for example, a liquid crystal display (LCD), a speaker, and a vibrator; the storage means 608, including. for example, a magnetic tape and a hard drive; and a communication means 609. The communication means 609 may allow the electronic device 600 to be in wireless or wired communication with other devices for data exchange. Although FIG. 6 illustrates the electronic device 600 with various means, it should be understood that it is not necessary to implement or have all the shown means. Alternatively, more or fewer means may be implemented or provided.

According to this embodiment of the disclosure, the foregoing process described with reference to the flowchart may be implemented as a computer software program. For example, an embodiment of the disclosure includes a computer program product including a computer program carried on a non-transitory computer-readable medium. The computer program includes program code for executing the method shown in the flowchart. In this embodiment, the computer program may be downloaded and installed from the network by the communication means 609, or installed from the storage means 608, or installed from the ROM 602. The computer program, when executed by the processing means 601, performs the above functions limited in the data display method in this embodiment of the disclosure.

The electronic device provided by this embodiment of the disclosure and the data display method provided by the foregoing embodiment belong to the same disclosure concept. and for technical details not described in detail in this embodiment, reference may be made to the foregoing embodiment. This embodiment and the foregoing embodiment have the same beneficial effects.

An embodiment of the disclosure provides a computer storage medium, storing a computer program. The program, when executed by a processor, implements the data display method provided by the foregoing embodiment.

It should be noted that the computer-readable medium in the disclosure may be a computer-readable signal medium, or a computer-readable storage medium, or any combination of the above. For example, the computer-readable storage medium may include but not limited to: electrical, magnetic, optical, electromagnetic, infrared, or semiconductor apparatuses or devices, or any combination thereof. More specific examples of the computer-readable storage medium may include but not limited to: an electrical connection with one or more wires, a portable computer disk, a hard drive, a random access memory (RAM), a read-only memory (ROM), an erasable programmable read-only memory (EPROM) or a flash (FLASH), fiber optics, a portable compact disc read-only memory (CD-ROM), an optical storage device, a magnetic storage device, or any proper combination of the above. In the disclosure, the computer-readable storage medium may be any tangible medium including or storing a program, and the program may be used by an instruction execution apparatus or device, or used in conjunction with the instruction execution apparatus or device. However, in the disclosure, the computer-readable signal medium may include data signals propagated in a baseband or propagated as a part of a carrier wave, which carry computer-readable program code. The propagated data signals may have a plurality of forms, including but not limited to electromagnetic signals, optical signals, or any proper combination of the above. The computer-readable signal medium may also be any computer-readable medium other than the computer-readable storage medium. The computer-readable signal medium may send, propagate, or transmit the program used by the instruction execution apparatus or device, or used in conjunction with the instruction execution apparatus or device. The program code included in the computer-readable medium may be transmitted by any proper medium including but not limited to a wire, an optical cable, radio frequency (RF), etc., or any proper combination of the above.

In some implementations, a client and a server may communicate using any currently known or future-developed network protocols such as a hyper text transfer protocol (HTTP), and may also be may be in communication connection with digital data in any form or medium (e.g., a communication network). For example, examples of the communication network include a local area network ("LAN"), a wide area network ("WAN"), Internet work (e.g., Internet), a peer-to-peer network (e.g., an ad hoc peer-to-peer network), and any currently known or future-developed networks.

The computer-readable medium may be included in the electronic device; and may separately exist without being assembled in the electronic device.

The computer-readable medium carries one or more programs. The one or more programs, when executed by the electronic device, enable the electronic device to: determine, in response to a display instruction for target display data, candidate positions in a display region according to a preset display mode, and determine a reference position in the display region according to the preset display mode and the positions of the current display data in the display region; determine, according to the distances between the candidate positions and the reference position, priority values of the candidate positions; and determine a target position from the candidate positions according to the priority values, and display target display data according to the target position.

The computer program code for executing the operations of the disclosure may be written in one or more programming languages or a combination thereof. The programming languages include but not limited to object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or entirely executed on the remote computer or server. In the case of involving the remote computer, the remote computer may be connected to the user computer via any type of network, including a local area network (LAN) or wide area network (WAN), or may be connected to an external computer (e.g., utilizing an Internet service provider for Internet connectivity).

The flowcharts and block diagrams in the accompanying drawings illustrate system architectures, functions, and operations possibly implemented by the method and the computer program product according to the various embodiments of the disclosure. In this regard, each block in the flowcharts or block diagrams may represent a module, a program segment, or a portion of code, and the module, program segment, or portion of code includes one or more executable instructions for implementing specified logical functions. It should be noted that in some alternative implementations, functions marked in the blocks may also occur in an order different from that marked in the accompanying drawings. For example, two consecutively-shown blocks may actually be executed in parallel basically, but sometimes may also be executed in a reverse order, which depends on involved functions. It should be further noted that each block in the block diagrams and/or flowcharts as well as a combination of the blocks in the block diagrams and/or flowcharts may be implemented by using a dedicated hardware-based system that executes specified functions or operations, or using a combination of special hardware and computer instructions.

The units described in the embodiments of the disclosure may be implemented through software or hardware. The names of the units and modules do not limit the units and the modules in certain cases.

The functions described above in this specification may be at least partially executed by one or more hardware logic components. For example, exemplary hardware logic components that may be used include but not limited to a field programmable gate array (FPGA), an application specific integrated circuit (ASIC), application specific standard parts (ASSPs), a system on chip (SOC), a complex programmable logic device (CPLD), etc.

In the context of the disclosure, a machine-readable medium may be a tangible medium that may contain or store a program, and the program may be used by the instruction execution apparatus or device, or used in conjunction with the instruction execution system, apparatus, or device. The machine-readable medium may be a machine-readable signal medium or a machine-readable storage medium. The machine-readable medium may include but not limited to electronic, magnetic, optical, electromagnetic, infrared, or semiconductor apparatuses or devices, or any proper combination of the above content. More specific examples of the machine-readable storage medium may include: an electrical connection based on one or more wires, a portable computer disk, a hard drive, a random access memory (RAM), a read only memory (ROM), an erasable programmable read only memory (EPROM or a flash memory), fiber optics, a portable compact disc read only memory (CD-ROM), an optical storage device, a magnetic storage device, or any proper combination of the above.

According to one or more embodiments of the disclosure, Example 1 provides a data display method. The method includes the following:

In response to a display instruction for target display data, candidate positions in a display region are determined according to a preset display mode, and a reference position in the display region are determined according to the preset display mode and positions of current display data in the display region.

Priority values of the candidate positions are determined based on distances between the candidate positions and the reference position.

A target position is determined from the candidate positions based on the priority values, and the target display data is displayed according to the target position.

According to one or more embodiments of the disclosure, Example 2 provides a data display method, where the preset display mode includes a data distribution method, a data distribution position, and a data overlap degree.

The candidate positions and the reference positions are determined based on the following steps:

The candidate positions in the display region are determined according to the data distribution method.

The reference positions in the display region are determined according to the data distribution position, the data overlap degree, and the positions of the current display data in the display region.

According to one or more embodiments of the disclosure, Example 3 provides a data display method, where the step of determining reference positions in the display region according to the data distribution position, the data overlap degree, and the positions of the current display data in the display region includes the following:

At least one first reference position in the display region is determined according to the data distribution position.

At least one second reference position is determined from the positions of the current display data according to the data overlap degree, the data overlap degree being in inverse correlation with the number of the second reference positions.

The step of determining priority values of the candidate positions based on distances between the candidate positions and the reference positions includes the following:

The priority values of the candidate positions are determined based on a relationship between the candidate positions and the first reference positions as well as between the candidate positions and the second reference positions.

According to one or more embodiments of the disclosure, Example 4 provides a data display method, where the step of determining priority values of the candidate positions includes the following:

The candidate positions are traversed, and a first priority value of the traversed current candidate position is determined according to the sum of first distances between the traversed current candidate position and the at least one first reference position; the sum of the first distances is in inverse correlation with the first priority value.

A second priority value of the traversed current candidate position is determined according to the sum of second distances between the traversed current candidate position and the at least one second reference position; the sum of the second distances is in positive correlation with the second priority value.

A priority value of the traversed current candidate position is determined according to the first priority value and the second priority value until traversing is completed, and the priority values of the candidate positions are obtained.

According to one or more embodiments of the disclosure, Example 5 provides a data display method, where the step of determining a priority value of the traversed current candidate position according to the first priority value and the second priority value includes the following:

The sum of the first priority value and the second priority value is used as the priority value of the traversed current candidate position.

According to one or more embodiments of the disclosure, Example 6 provides a data display method, where the first priority value of the traversed current candidate position is determined based on the normalized sum of the first distances; and the second priority value of the traversed current candidate position is determined based on the normalized sum of the second distances.

According to one or more embodiments of the disclosure, Example 7 provides a data display method, where after the step of displaying the target display data according to the target position, the method further includes the following:

The current display data is updated according to the target display data, and array elements in a two-dimensional array are maintained according to the updated current display data; the array elements correspond to pixel points in the display region, and when the array elements are preset values, it represents that the corresponding pixel points belong to the current display data.

In response to a display instruction for new target display data, positions of current display data in the display region are determined according to the two-dimensional array.

According to one or more embodiments of the disclosure, Example 8 provides a data display method, where the display instruction is generated based on sending or receiving the target display data.

According to one or more embodiments of the disclosure, Example 9 provides a data display method, where a display interface to which the display region belongs further includes a deployment region for preset interface elements; and the display region is determined based on the deployment region, and the deployment region is determined by attributes of the preset interface elements.

According to one or more embodiments of the disclosure, Example 10 provides a data display method, where the target display data includes interactive emojis; and the step of displaying the target display data according to the target position includes the following:

The target position is set as a position parameter for a preset feature point of the interactive emoji, and the interactive emoji is rendered according to the position parameter.

Further, although a plurality of operations are described in a particular order, it should not be understood as requiring these operations to be performed in the shown particular order or in a sequential order. In certain environments, multitasking and parallel processing may be advantageous. Similarly, although several specific implementation details are included in the above discussion, these specific implementation details should not be interpreted as limitations on the scope of the disclosure. Certain features described in the context of separate embodiments may also be implemented in combination in a single embodiment. Conversely, various features described in the context of a single embodiment may also be implemented separately or in any suitable sub-combination in a plurality of embodiments.

We claim:

1. A data display method implemented by an electronic device, the method comprising:

determining, in response to a display instruction for target display data, candidate positions in a display region according to a preset display mode, and determining a reference position in the display region according to the preset display mode and positions of current display data in the display region;

determining priority values of the candidate positions based on distances between the candidate positions and the reference position; and determining a target position from the candidate positions based on the priority values, and displaying the target display data according to the target position;

wherein the preset display mode comprises a data distribution method, a data distribution position, and a data overlap degree;

wherein determining the reference position in the display region comprises:

determining at least one first reference position in the display region according to the data distribution position; and determining at least one second reference position from the positions of the current display data according to the data overlap degree, the data overlap degree being in inverse correlation with a number of second reference positions; or wherein determining the priority values of the candidate positions comprises:

determining the priority values of the candidate positions based on a relationship between the candidate positions and the first reference positions and between the candidate position and the second reference position.

2. The method according to claim 1, wherein the candidate positions are determined based on the following:

determining the candidate positions in the display region according to the data distribution method.

3. The method according to claim 1, wherein determining the priority values of the candidate positions comprises:

traversing the candidate positions, and determining a first priority value of the traversed current candidate position according to a sum of first distances between the traversed current candidate positions and the at least one first reference position, the sum of the first distances being in inverse correlation with the first priority value;

determining a second priority value of the traversed current candidate position according to a sum of second distances between the traversed current candidate positions and the at least one second reference position; the sum of the second distances being in positive correlation with the second priority value; and determining a priority value of the traversed current candidate position according to the first priority value and the second priority value until the traversing is completed, and obtaining the priority values of the candidate positions.

4. The method according to claim 3, wherein determining the priority value of the traversed current candidate position according to the first priority value and the second priority value comprises:

using the sum of the first priority value and the second priority value as the priority value of the traversed current candidate position.

5. The method according to claim 3, wherein the first priority value of the traversed current candidate position is determined based on the normalized sum of the first distances; and the second priority value of the traversed current candidate position is determined based on the normalized sum of the second distances.

6. The method according to claim 1, further comprising: after displaying the target display data according to the target position, updating the current display data according to the target display data, and maintaining array elements in a two-dimensional array according to the updated current display data; the array elements corresponding to pixel points in the display region, and when the array elements are preset values, it representing that the corresponding pixel points belong to the current display data; and in response to a display instruction for new target display data, determining positions of the current display data in the display region according to the two-dimensional array.

7. The method according to claim 1, wherein the display instruction is generated by sending or receiving the target display data.

8. The method according to claim 1, wherein a display interface to which the display region belongs further comprises a deployment region for preset interface elements; and the display region is determined based on the deployment region, and the deployment region is determined by attributes of the preset interface elements.

9. The method according to claim 1, wherein the target display data comprises an interactive emoji; and displaying the target display data according to the target position comprises:

setting the target position as a position parameter for a preset feature point of the interactive emoji, and rendering the interactive emoji according to the position parameter.

10. An electronic device, comprising:

one or more processors; and a storage means configured to store one or more programs, wherein when the one or more programs are executed by the one or more processors, the one or more processors are caused to:

determine, in response to a display instruction for target display data, candidate positions in a display region according to a preset display mode, and determine a reference position in the display region according to the preset display mode and positions of current display data in the display region;

determine priority values of the candidate positions based on distances between the candidate positions and the reference position; and determine a target position from the candidate positions based on the priority values, and display the target display data according to the target position, wherein the preset display mode comprises a data distribution method, a data distribution position, and a data overlap degree;

wherein the one or more processors are caused to determine the reference position in the display region by being caused to:

determine at least one first reference position in the display region according to the data distribution position; and determine at least one second reference position from the positions of the current display data according to the data overlap degree, the data overlap degree being in inverse correlation with a number of second reference positions; or wherein the one or more processors are caused to determine the priority values of the candidate positions by being caused to:

determine the priority values of the candidate positions based on a relationship between the candidate positions and the first reference positions and between the candidate position and the second reference position.

11. The electronic device according to claim 10, wherein the candidate positions are determined based on the following:

determining the candidate positions in the display region according to the data distribution method.

12. The electronic device according to claim 10, wherein the one or more processors are caused to determine the priority values of the candidate positions comprises being caused to:

traverse the candidate positions, and determining a first priority value of the traversed current candidate position according to a sum of first distances between the traversed current candidate positions and the at least one first reference position, the sum of the first distances being in inverse correlation with the first priority value;

determine a second priority value of the traversed current candidate position according to a sum of second distances between the traversed current candidate positions and the at least one second reference position; the sum of the second distances being in positive correlation with the second priority value; and determine a priority value of the traversed current candidate position according to the first priority value and the second priority value until the traversing is completed, and obtain the priority values of the candidate positions.

13. The electronic device according to claim 12, wherein the one or more processors are caused to determine the priority value of the traversed current candidate position according to the first priority value and the second priority value comprises being caused to:

use the sum of the first priority value and the second priority value as the priority value of the traversed current candidate position.

14. The electronic device according to claim 12, wherein the first priority value of the traversed current candidate position is determined based on the normalized sum of the first distances; and the second priority value of the traversed current candidate position is determined based on the normalized sum of the second distances.

15. The electronic device according to claim 10, wherein the one or more processors are caused to: after displaying the target display data according to the target position, update the current display data according to the target display data, and maintain array elements in a two-dimensional array according to the updated current display data; the array elements corresponding to pixel points in the display region, and when the array elements are preset values, it representing that the corresponding pixel points belong to the current display data; and in response to a display instruction for new target display data, determine positions of the current display data in the display region according to the two-dimensional array.

16. The electronic device according to claim 10, wherein the display instruction is generated by sending or receiving the target display data.

17. The electronic device according to claim 10, wherein a display interface to which the display region belongs further comprises a deployment region for preset interface elements; and the display region is determined based on the deployment region, and the deployment region is determined by attributes of the preset interface elements.

18. A non-transitory storage medium comprising computer executable instructions, wherein the computer executable instructions, when executed by a computer processor, are configured to:

determine, in response to a display instruction for target display data, candidate positions in a display region according to a preset display mode, and determine a reference position in the display region according to the preset display mode and positions of current display data in the display region;

determine priority values of the candidate positions based on distances between the candidate positions and the reference position; and determine a target position from the candidate positions based on the priority values, and display the target display data according to the target position, wherein the preset display mode comprises a data distribution method, a data distribution position, and a data overlap degree;

wherein the computer executable instructions are configured to determine the reference position in the display region by being configured to:

determine at least one first reference position in the display region according to the data distribution position; and determine at least one second reference position from the positions of the current display data according to the data overlap degree, the data overlap degree being in inverse correlation with a number of second reference positions; or wherein the computer executable instructions are configured to determine the priority values of the candidate positions by being configured to:

determine the priority values of the candidate positions based on a relationship between the candidate positions and the first reference positions and between the candidate position and the second reference position.

* * * * *